United States Patent [19]
Donovan

[11] Patent Number: 5,990,903
[45] Date of Patent: Nov. 23, 1999

[54] METHOD AND APPARATUS FOR PERFORMING CHROMA KEY, TRANSPARENCY AND FOG OPERATIONS

[75] Inventor: Walter E. Donovan, Milpitas, Calif.

[73] Assignee: Micron Technologies, Inc., Boise, Id.

[21] Appl. No.: 08/794,749

[22] Filed: Feb. 3, 1997

[51] Int. Cl.⁶ .................................................. G06T 15/00
[52] U.S. Cl. .......................................... 345/432; 345/435
[58] Field of Search .................................. 345/429, 431, 345/426, 432, 435

[56] References Cited

U.S. PATENT DOCUMENTS

| | | | |
|---|---|---|---|
| 4,645,459 | 2/1987 | Graf et al. | 345/426 |
| 5,621,869 | 4/1997 | Drews | 345/435 |
| 5,740,343 | 4/1998 | Tarolli et al. | 345/430 |
| 5,754,185 | 5/1998 | Hsiao et al. | 345/431 |
| 5,793,427 | 8/1998 | Mills et al. | 348/391 |
| 5,798,767 | 8/1998 | Poole et al. | 345/431 |

*Primary Examiner*—Mark K. Zimmerman
*Assistant Examiner*—Motilewa Good-Johnson
*Attorney, Agent, or Firm*—Blakely, Sokoloff, Taylor & Zafman LLP

[57] ABSTRACT

A method and apparatus for chroma keying filtered textures are provided. Chroma keying is performed which replaces the input texel color with a new color if the input texel color matches the chroma color. The chroma key circuitry keeps the input texel color and sets the alpha component to 1 if the input texel color does not match the chroma color. The chroma keyed texels are filtered using bilinear filtering. The color components of the filtered texels are fogged using a fog factor, a fog color, and the alpha component of the filtered texel. The fogged and filtered signal is blended with a background color to produce an output color for the texels.

37 Claims, 5 Drawing Sheets

METHOD AND APPARATUS FOR PERFORMING CHROMA KEY, TRANSPARENCY AND FOG OPERATIONS

FIELD OF THE INVENTION

The invention relates to the field of computer graphics. In particular, the invention relates to a method of chroma keying filtered textures, with and without fogging, drawn on a raster graphics display.

BACKGROUND OF THE INVENTION

A computer graphic image is typically composed of a number of objects. Objects are rendered onto a background image. Portions of the objects can be defined as transparent to enable overlay of the objects onto a variety of later defined background images. During rendering, the object may be combined with previously generated objects (e.g., to reuse a complex background) using compositing techniques.

Compositing is the combining of two images by overlaying or blending them. In a composited image, the value of each pixel is computed from the component images. One technique typically used is an overlay in which the pixels of the foreground image must be given transparency values as well as whatever other values the pixels may have, such as color information. Therefore, in the composited image, a pixel's value is taken from the background image unless the foreground image has a nontransparent value at that point. If the foreground image has a nontransparent value at that point, the value is taken form the foreground image. Multiple images may also be blended resulting in pixel values that are linear combinations of the values of the multiple component pixels.

Problems arise, however, when drawing an image which contains transparent elements. As an example, consider rendering an image of a tree. While it is desired to render only the tree, the tree picture is typically stored in a rectangular image, not a tree-shaped image. Thus, some method is required to identify the parts of the image that are not to be considered part of the tree, and then these parts, to be called the transparent parts, are to have no effect on the image drawn. Thus, when drawing the tree image, the display hardware will draw the non-transparent parts of the tree and not draw the transparent parts.

Two common compositing techniques used in the prior art to render an object onto a transparent background are alpha-channel compositing and chroma keying. Alpha-channel compositing solves the problem of drawing a transparent image by storing an alpha channel which utilizes an alpha value to encode the transparency of each pixel. However, this requires additional memory to be allocated in addition to that allocated for the image. Chroma keying, however, does not require additional storage space because this technique represents the transparent areas of the image by a specific color, known as the chroma color. With chroma keying, the hardware compares each pixel with the chroma color, and if they are identical, does not draw the pixel on the display. These techniques have been expanded to be applicable to texture mapping. Sophisticated computer graphic renderings typically include patterns or images that are mapped to a surface. This approach is known as texture mapping; the pattern or image is called a texture map, and its individual elements are often called texels. The texture map resides in its own (u, v) texture coordinate space. At each rendered pixel, selected texels are used either to substitute for or to scale one or more of the surface's material properties, such as its diffuse color components. One pixel is often covered by a number of texels. It should be noted that chroma keying as described above only works if the image is point sampled; i.e., one texel is read for each pixel displayed.

Prior art rendering as performed by chroma keying typically is applied on unfiltered and unfogged textures. However, texture maps are generally filtered because improving the appearance of texture-mapped polygons requires antialiasing texture mapping. There are many well-known techniques for antialiasing texture mapping. One such technique employs bilinear filtering which utilizes the colors of the four nearest texels and weighs the colors together to acquire a filtered representation of that texture. For a further description of bilinear filtering, see Wolberg, George, *Digital Image Warping*, IEEE Computer Society Press (1990) pp. 57–61.

However, a problem arises if the texture map is to be filtered. Instead of reading a single texel at a time and using that texel, multiple texels are read and filtered, and the filtered result is then displayed. This results in three scenarios: (a) all texels read are the chroma color; (b) no texels read are the chroma color; or (c) some texels read are the chroma color. In the case where all texels read are the chroma color, the filtered result will generally be the chroma color, and the prior art will properly not draw that texel. In the case where none of the texels read are the chroma color, no transparent texels are involved, the chroma color will not be a likely result of filtering, and the prior art will properly draw that texel.

In the case where some texels read are the chroma color, the aforementioned problem arises. In this case, the texel should be considered partially transparent (as it has some transparent texels and some opaque texels) but what happens with the prior art is that the texels and the chroma color will be filtered together and, since the resulting color is very unlikely to match the chroma color, the filtered result displayed. Thus, the act of filtering changes the colors at the boundary of the texture map, mixing the image colors with the colors of the surrounding background texels, so that the background texels in the immediate vicinity of the image no longer match the chroma color. This causes a border or outline to appear around the rendered image so that if the chroma color is blue, as it often is, the resulting image will display a blue fringe. Consequently, it is desirable to perform chroma keying of filtered textures.

The technique of "fogging" or adding a fog effect to an image displayed is popular in video games to generate fog or smoke special effects. Fogging adds an additional level of complexity to renderings.

SUMMARY

A method and apparatus for chroma keying fogged and filtered textures in a computer system are provided. According to one aspect of the invention, it is determined whether a texel having a particular color matches a predetermined color. If it is determined that the texel color matches the predetermined color, then the texel is replaced with a texel of a different color. The texels are then filtered. The chroma keyed and filtered texels are then fogged. The chroma keyed, fogged and filtered texels that result are blended with a background color.

In one embodiment the apparatus generally includes a processor, a memory coupled to the processor, and a co-processor coupled to the processor and the memory. The co-processor determines whether a texel having a particular color matches a predetermined color. If it is determined that the texel color matches the predetermined color, then the co-processor replaces the texel with a texel of a different color. The co-processor then filters the texels. The co-processor includes circuitry for fogging the chroma keyed and filtered texels. The chroma keyed, fogged and filtered texels are blended with a background color.

These and other features, aspects, and advantages of the present invention will be apparent from the accompanying drawings and from the detailed description and appended claims which follow.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and an apparatus for chroma keying filtered textures in a computer system are provided. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

Figure 1:
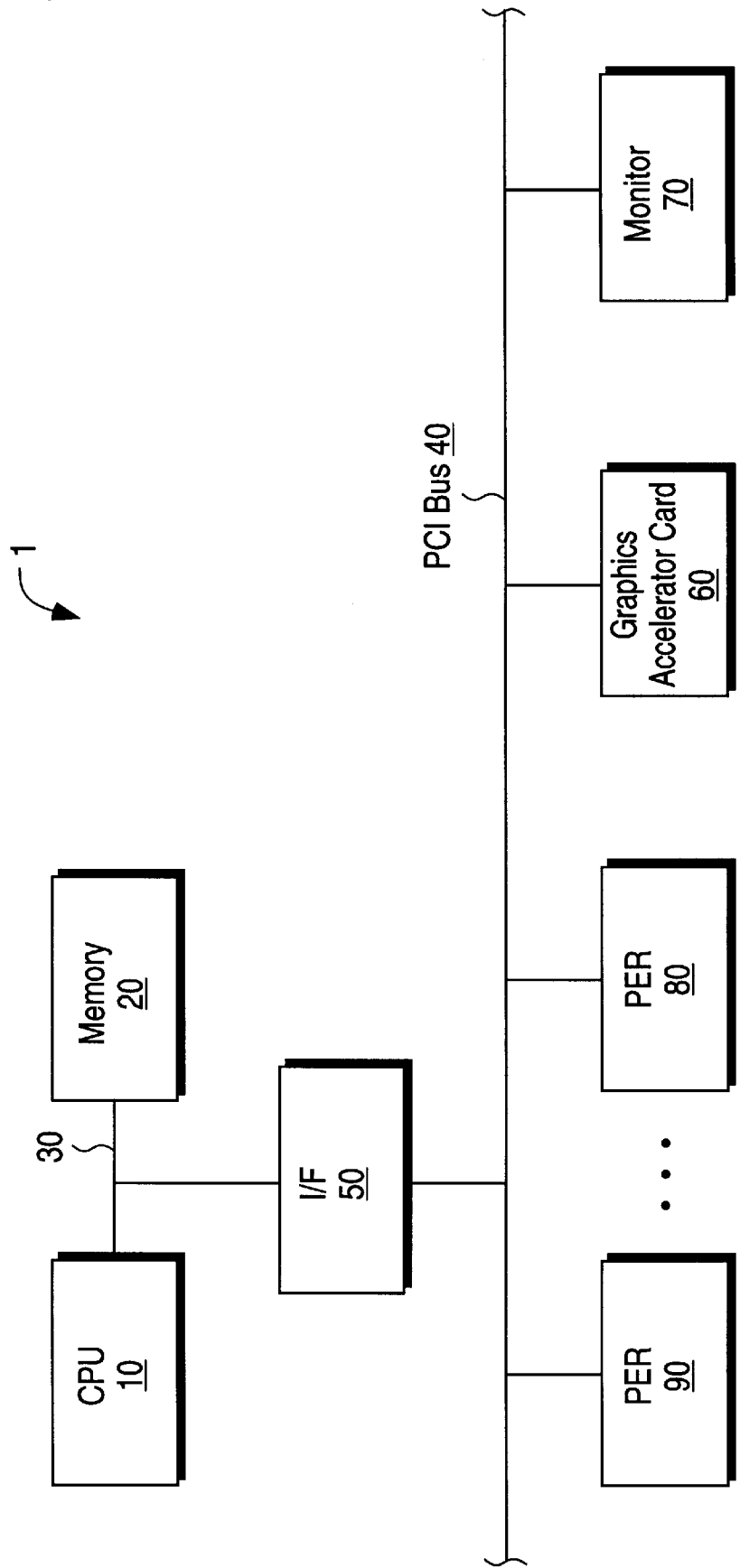
FIG. 1 illustrates an embodiment of a computer system in which the present invention is implemented.

FIG. 1 illustrates one embodiment of a computer system 1 in which the present invention is implemented. The computer system 1 includes a central processing unit (CPU) 10 coupled to system memory 20 by a system bus 30. The CPU 10 and memory 20 are coupled to a PCI (peripheral component interconnect) bus 40 through a bus interface 50 via the system bus 30. Coupled to the PCI bus 40 is a graphics/video accelerator card 60, as well as various peripheral devices 80 and 90. The graphics/video accelerator card 60 is coupled to a display monitor 70.

Figure 2:
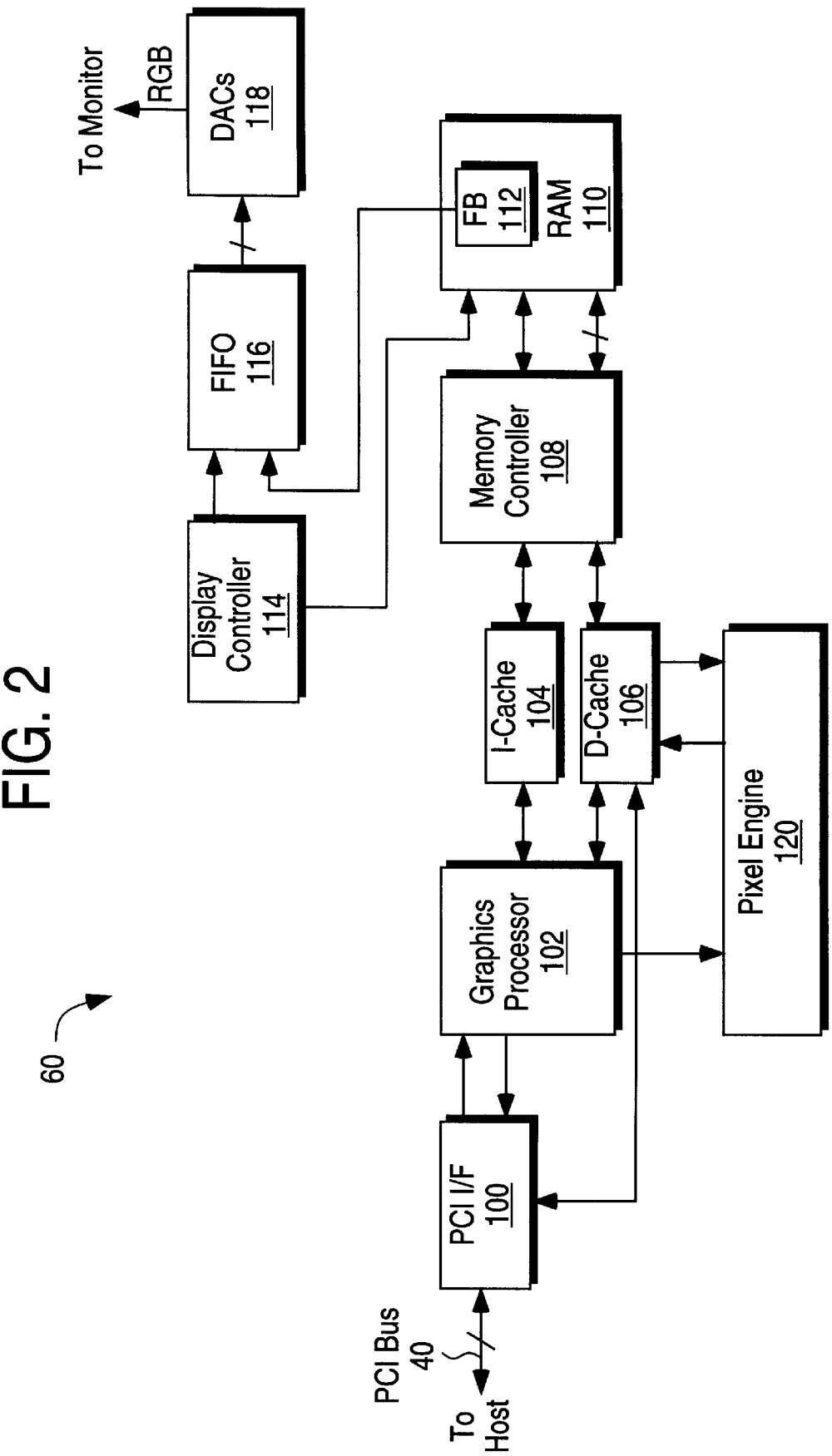
FIG. 2 illustrates an embodiment of graphics/video processing circuitry in which the present invention is implemented.

FIG. 2 illustrates exemplary circuitry included within the graphics/video accelerator card 60, including circuitry for performing various three-dimensional (3D) graphics function. In FIG. 2, a PCI interface 100 couples the graphics/video accelerator card 60 to the PCI bus 40. A graphics processor 102 is coupled to the PCI interface 100 and is designed to perform various graphics and video processing functions. The graphics processor 102 is typically a RISC (reduced instruction set computing) processor.

A pixel engine 120 is coupled to the graphics processor 102 and contains circuitry for performing various graphics functions, such as bilinear filtering, fogging, and blending, as will be described below. A local random access memory (RAM) 110 stores both source pixel color values and destination pixel color values. Destination color values are stored in a frame buffer 112 within memory 110. In the preferred embodiment, memory 110 is implemented using dynamic RAM (DRAM). A display controller 114 is coupled to RAM 110 and to a first-in first-out buffer (FIFO) 116. Under the control of the display controller 114, destination color values stored in frame buffer 112 are provided to FIFO 116. Destination values stored in FIFO 116 are provided to a set of digital-to-analog converters (DACs) 118, which output red, green, and blue analog color signals to a monitor.

Also coupled to RAM 110 is a memory controller 108. Memory controller 108 controls the transfer of data between RAM 110 and both the pixel engine 120 and the graphics processor 102. An instruction cache 104 I-cache and a data cache 106 D-cache are each coupled to the graphics processor 102 and to the memory controller 108 and are used to store frequently used instructions and data, respectively. The data cache 106 is also coupled to the PCI interface 100 and to the pixel engine 120.

Figure 3:
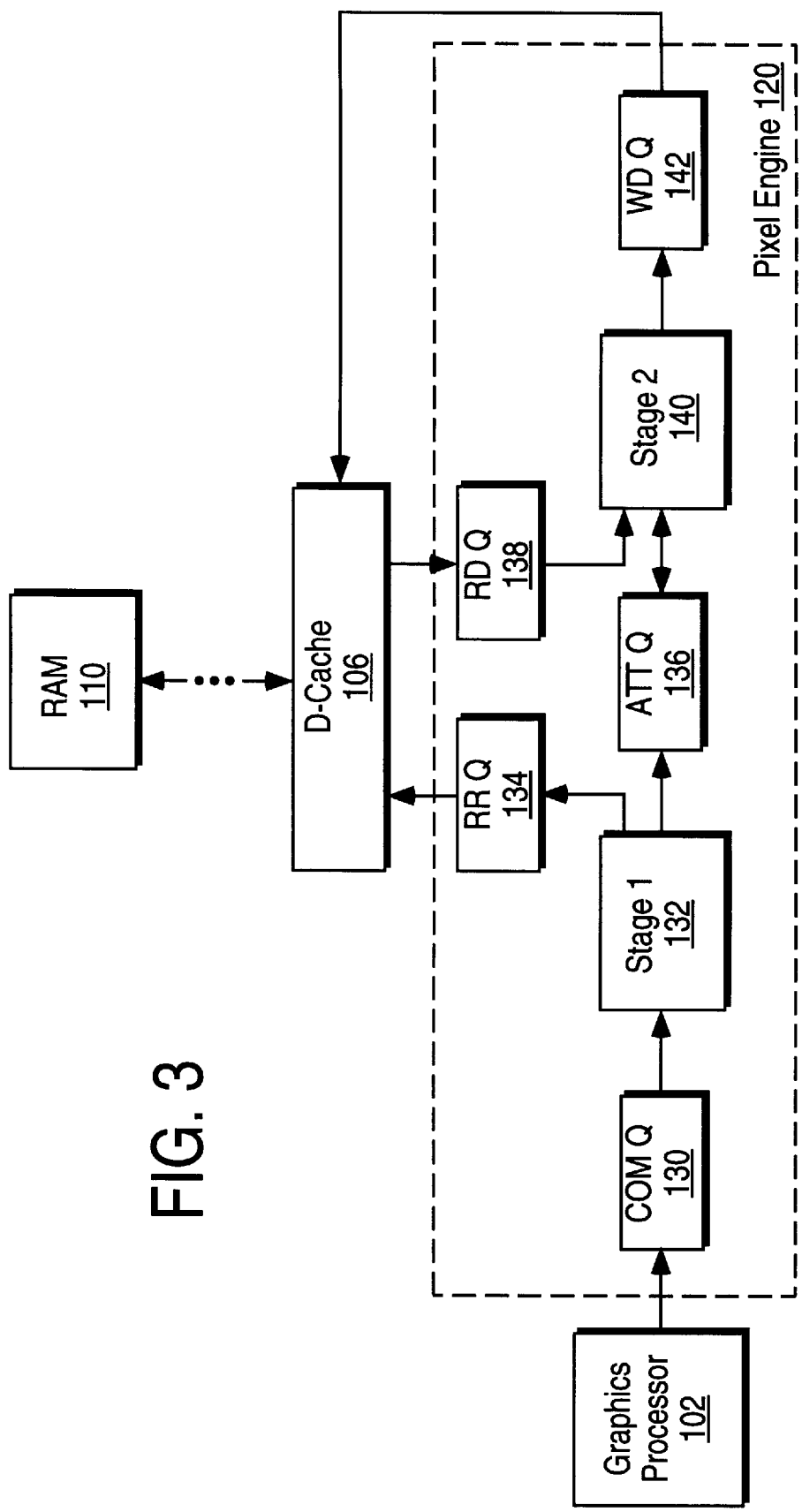
FIG. 3 illustrates an embodiment of a pixel engine in which the present invention is implemented.

FIG. 3 illustrates one embodiment of the pixel engine 120 in greater detail. The pixel engine 120 includes a command queue 130, a read request queue 134, an attribute queue 136, a read data queue 138, a write data queue 142, stage 1 processing circuitry 132, and stage 2 processing circuitry 140. Commands issued by the graphics processor 102 are received by the pixel engine 120 and stored in command queue 130. Commands stored in the command queue 130 are then provided to stage 1 circuitry 132. Stage 1 circuitry 132 accumulates pixel attributes and determines the number of read and write cycles that must be performed for each command. Pixel attributes may include, for example, x, y, and z components, R, G, and B components, alpha (transparency), u and v components, and fog. In addition, stage 1 circuitry 132 generates memory read and write requests and addresses associated with each read and write operation. Memory read requests generated by stage 1 circuitry 132 are stored in read request queue 134. Read request queue 134 then outputs each read request to the data cache 106. In addition, stage 1 circuitry 132 outputs pixel attributes to attribute queue 136, which subsequently provides the attributes to stage 2 processing circuitry 140.

During read operations, pixel color values are read from data cache 106 (the color values may originate from RAM 110) into read data queue 138. The pixel color values are then output from read data queue 138 into stage 2 circuitry 140, which performs functions including bilinear filtering, texture application, fog effect, color space conversion, blending, and dithering. Processed color values are then provided by stage 2 circuitry 140 to a write data queue 142, which then outputs the processed color values to the data cache 106.

Attribute queue 136 stores pixel attributes which are not used to look up data in data cache 106 or RAM 110. When data is read from data cache 106 into stage 2 circuitry 140, the corresponding attribute values stored in attribute queue 136 are read out in parallel from attribute queue 136 to stage 2 circuitry 140.

Figure 4:
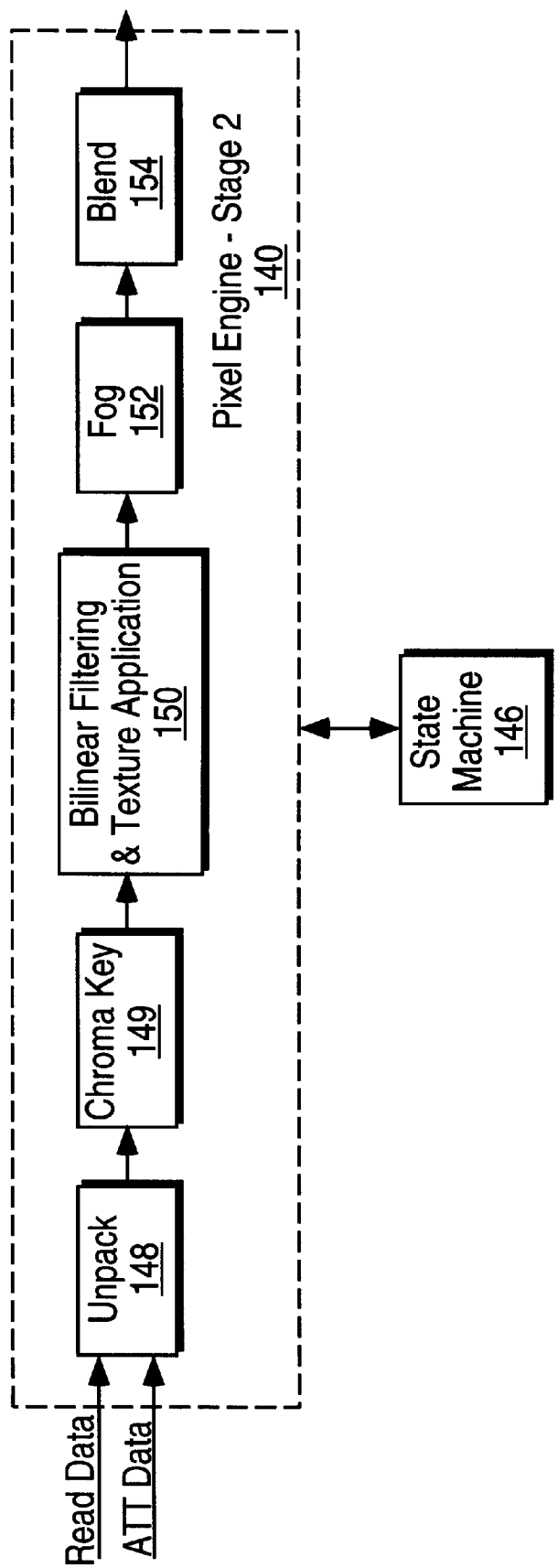
FIG. 4 illustrates an embodiment of a pixel pipeline in which the present invention is implemented.

In one embodiment, the present invention is implemented in circuitry within stage 2 circuitry 140. As is readily apparent to one skilled in the art, the process could be implemented in other portions of the circuit. FIG. 4 illustrates an embodiment of stage 2 circuitry 140 in greater detail. Stage 2 circuitry 140 implements a pixel pipeline in which the following functions are performed: pixel unpacking, chroma keying, bilinear filtering and texture application, fogging, and blending. These functions are coordinated and timed by a state machine 146. It is contemplated that the stage 2 circuitry can include fewer than all the functions identified above.

In stage 2 circuitry 140, an unpack circuit 148 receives pixel color values from RAM 110 or data cache 106 via signal READ DATA and receives pixel attribute values via signal ATT DATA. Unpack circuit 148 converts color data into segments of 8 bits. For example, color data might be provided to the unpack circuit 148 in 16-bit words, each word consisting of, for example, three five-bit color segments and 1 unused bit. Accordingly, unpack circuit 148 would convert ("unpack") each five-bit color segment within each 16-bit word into a separate 8-bit color value. "Unpacked" color values are then provided by unpack circuit 148 to chroma key circuitry 149.

In one embodiment of the present invention, chroma key circuitry 149 functions by comparing the color of each input texel signal with a chroma color stored in the chroma key circuitry 149. In RGB color space, if chroma key circuitry 149 determines that the color of the input texel is the same as the stored chroma color, then the texel output by chroma key circuitry 149 has signal component values (A, R, G, B) of 0, 0, 0, and 0, respectively which corresponds to black. In RGB color space the components A, R, G, and B represent the alpha, red, green, and blue components of the color signal, respectively. Therefore, if the color of the input texel is the same as the chroma color as determined by the chroma color circuitry 149, a transparent texel is output. This operation is not limited to RGB color space, and the chroma key circuitry 149, upon detecting that the color of an input texel is the same as a stored chroma color, may be made to output signal component values representative of black which corresponds to a transparent texel in a particular color space.

If chroma key circuitry 149 determines that the color of the input texel is not the same as the stored chroma color, the texel output by the chroma key circuitry 149 has signal component values (A, R, G, B) of 1, R, G, and B, respectively. Thus, if the color of the input texel is different from the chroma color as determined by the chroma color circuitry 149, then the output texel will have the same red, green, and blue signal components as the input texel, with the alpha signal component being set equal to 1. This results in an opaque output texel having the same color as the input texel. Chroma keyed texels are then provided by chroma key circuitry 149 to bilinear filtering and texture application circuitry 150.

Improving the appearance of textured surfaces requires antialiasing texture mapping. Bilinear filtering circuitry 150 performs functions to improve the application of textured surfaces to an image. In one embodiment of the present invention bilinear filtering is used. The bilinear filtering circuitry 150 takes the color of the four nearest texels and weighs the colors together to get a filtered representation of that texture. When applying bilinear filtering, the output texel is a function of four adjacent input texels and can be considered a 2×2 convolution with weights as shown below:

$f_1 f_2 \quad f_1(1-f_2)$ $(1-f_1)f_2 \quad (1-f_1)(1-f_2)$ where $f_1$ and $f_2$ are in the range 0 to 1, inclusive. In RGB color space, bilinear filtering circuitry 150 outputs a filtered color signal (A, R, G, B) comprised of filtered alpha, red, green, and blue components. Bilinear filtering circuitry 150 outputs pixel color values A, R, G, and B to fog circuitry 152.

Fog circuitry 152 applies fog to selected filtered texels where fog is to appear on a displayed image. The fog is represented by a color signal having components Rfog, Gfog, and Bfog which represent the red, green, and blue components of the fog signal, respectively. In one embodiment of the present invention a fogged and filtered signal (A1, R1, G1, B1) is generated for each component of the color signal (A, R, G, B) according to equations (1)–(4).

$$A1 = A \tag{1}$$

$$R1 = [R*(1-f)] + (R\text{fog}*f*A) \tag{2}$$

$$G1 = [G*(1-f)] + (G\text{fog}*f*A) \tag{3}$$

$$B1 = [B*(1-f)] + (B\text{fog}*f*A) \tag{4}$$

In equations (1)–(4), A represents the alpha component of the filtered signal from bilinear filtering circuitry 150, R represents the red component of the filtered color signal from bilinear filtering circuitry 150, Rfog represents the red component of the fog color, f represents the fog factor, G represents the green component of the filtered color signal from bilinear filtering circuitry 150, Gfog represents the green component of the fog color, B represents the blue component of the filtered color signal from bilinear filtering circuitry 150, and Bfog represents the blue component of the fog color. The fog factor (f), which represents the amount or percentage of coverage of fog, can have a value ranging from 0 to 1, inclusive. If f is 0 then no fog is displayed; if f is 1 then only fog is displayed. Fog circuitry 152 outputs color values (A1, R1, G1, B1) to blend circuitry 154.

Equations (1)–(4) are for use in RGB color space, however, equations (2)–(4) are generalized in equation (5) for application in other color spaces.

$$Xn1 = [Xn*(1-f)] + (Xn\text{fog}*f*A) \tag{5}$$

In equation (5), A represents the alpha component of the filtered signal and f represents the fog factor as in equations (1)–(4). The variable Xn represents a particular component of a filtered color signal having n color components, and Xnfog represents the corresponding color component of the fog color. As applied to other color spaces, fog circuitry 152 outputs a value for the alpha component of the input signal according to equation (1) and outputs color values for each of the n color components of the input signal color space according to equation (5).

Blend circuitry 154 blends the filtered texel color with a background color to produce the color of the output texel. The background color is represented by a color signal having components Ab, Rb, Gb, and Bb which represent the alpha, red, green, and blue components of the background signal, respectively. If a filtered texel has not been fogged (f=0), the blend circuitry 154 generates an output color signal (Ao, Ro, Go, Bo) according to equations (6)–(9).

$$Ao = A + [(1-A)*Ab] \tag{6}$$

$$Ro = R + [(1-A)*Rb] \tag{7}$$

$$Go = G + [(1-A)*Gb] \tag{8}$$

$$Bo = B + [(1-A)*Bb] \tag{9}$$

In equations (6)–(9), A represents the alpha component of the filtered signal from bilinear filtering circuitry 150, Ab represents the alpha component of the background color, R represents the red component of the filtered color signal from bilinear filtering circuitry 150, Rb represents the red component of the background color, G represents the green component of the filtered color signal from bilinear filtering circuitry 150, Gb represents the green component of the background color, B represents the blue component of the filtered color signal from bilinear filtering circuitry 150, and Bb represents the blue component of the background color.

Equations (6)–(9) are for use in RGB color space, however, equations (7)–(9) are generalized in equation (10) for application in other color spaces.

$$Xno=Xn+[(1-A)*Xnb] \quad (10)$$

In equation (10), A represents the alpha component of the filtered signal as in equations (6)–(9). The variable Xn represents a particular component of a filtered color signal having n color components, and Xnb represents the corresponding color component of the background color. As applied to other color spaces, blend circuitry 154 outputs a value for the alpha component of the input signal according to equation (6) and outputs color values for each of the n color components of the input signal color space according to equation (10).

Blend circuitry 154 also blends a fogged and filtered texel color with a background color to produce the color of the output texel. In the case of a fogged and filtered texel, the output color signal (Ao, Ro, Go, Bo) is generated by the blend circuitry 154 according to equations (11)–(14).

$$Ao=A1+[(1-A1)*Ab] \quad (11)$$

$$Ro=R1+[(1-A1)*Rb] \quad (12)$$

$$Go=G1+[(1-A1)*Gb] \quad (13)$$

$$Bo=B1+[(1-A1)*Bb] \quad (14)$$

In equations (11)–(14), A1 represents the alpha component of the fogged and filtered signal from fog circuitry 152 (equation 1), Ab represents the alpha component of background color, R1 represents the red component of the fogged and filtered color signal from fog circuitry 152 (equation 2), Rb represents the red component of background color, G1 represents the green component of the fogged and filtered color signal from fog circuitry 152 (equation 3), Gb represents the green component of background color, B1 represents the blue component of the fogged and filtered color signal from fog circuitry 152 (equation 4), and Bb represents the blue component of background color.

Equations (11)–(14) are for use in RGB color space, however, equations (12)–(14) are generalized in equation (15) for application in other color spaces.

$$Xno=Xn1+[(1-A1)*Xnb] \quad (15)$$

In equation (15), A1 represents the alpha component of the fogged and filtered signal as in equations (11)–(14). The variable Xn1 represents a particular component of the fogged and filtered color signal having n color components, and Xnb represents the corresponding color component of the background color. As applied to other color spaces, blend circuitry 154 outputs a value for the alpha component of the input signal according to equation (11) and outputs color values for each of the n color components of the input signal color space according to equation (15).

Figure 5:
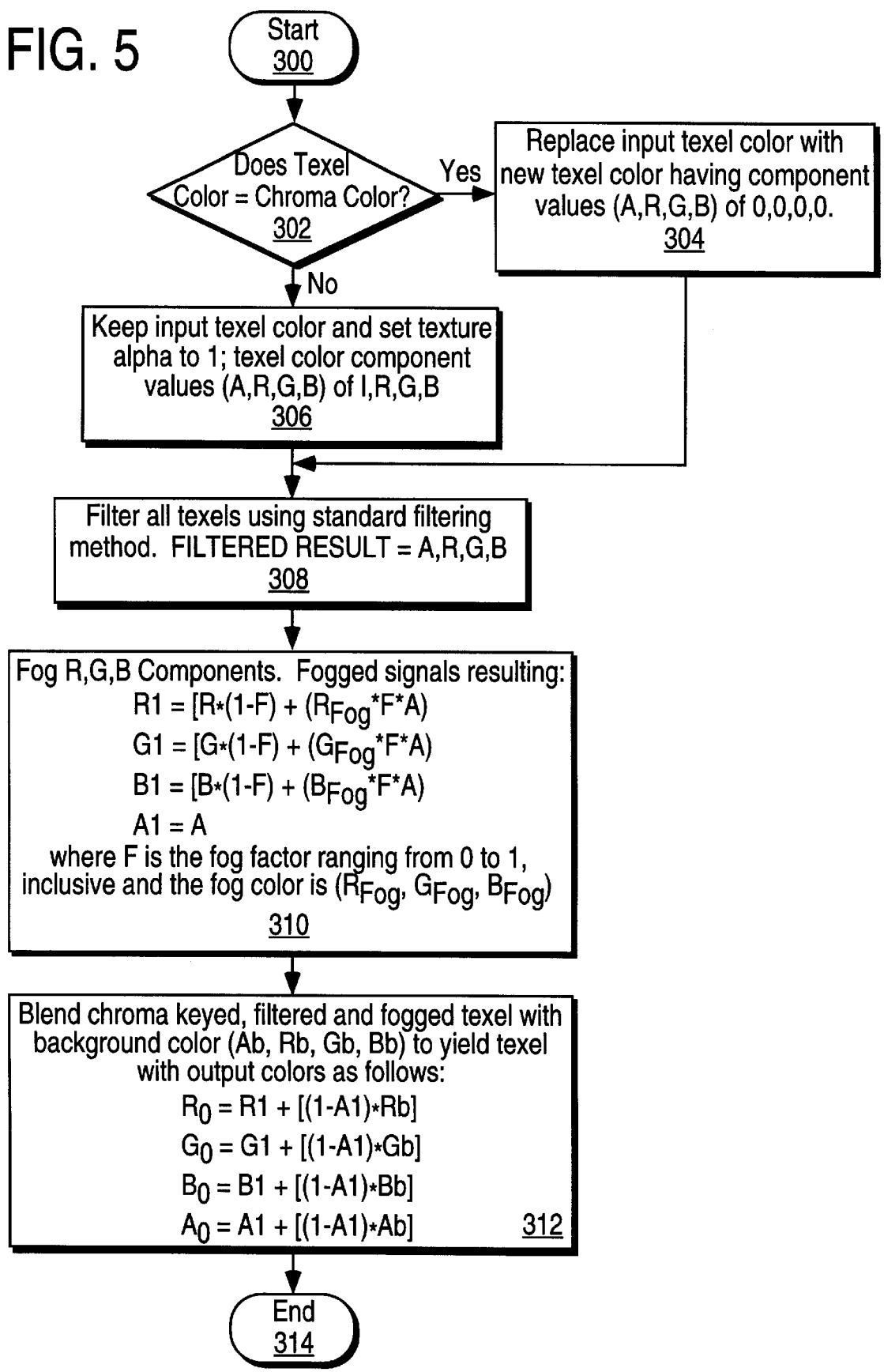
FIG. 5 illustrates a flow diagram for performing an embodiment of a process for chroma keying of fogged, filtered textures.

FIG. 5 illustrates a flow diagram of one embodiment for performing chroma keying of fogged, filtered textures in RGB space. The flow diagram starts at block 300. Operation continues at block 302, at which the color of each input texel is compared with a stored chroma color. If it is determined that the color of the input texel is the same as the stored chroma color, then operation continues at block 304 where the input texel is replaced by a texel having a color different than the input texel. In one embodiment of the present invention, the output texel has signal component values (A, R, G, B) of 0, 0, 0, and 0, respectively. Therefore, if the color of the input texel is the same as the chroma color then a transparent texel is output.

A color model is a specification of a three-dimensional color coordinate system. The embodiment of the present invention described herein operates on the red, green, and blue (RGB) color model. An alternate embodiment of the present invention operates on signals in the YCBCR, or YUV, color model. In an 8 bit version of this alternate embodiment, chroma key circuitry 149 functions by comparing the color of each input texel signal with a chroma color stored in the chroma key circuitry 149. If chroma key circuitry 149 determines that the color of the input texel is the same as the stored chroma color, then the texel output by chroma key circuitry 149 has signal component values (A, CR, Y, CB) of 0, 128, 16, and 128, respectively, in YCBCR color space to correspond to black. Therefore, if the color of the input texel is the same as the chroma color as determined by the chroma color circuitry 149, a transparent texel is output. Furthermore, the method and apparatus described herein may be applied to any color space which is linearly related to RGB or YCBCR color space or can be attained using a linear transformation of RGB or YCBCR color space.

Continuing with the RGB space example, if it is determined that the color of the input texel is not the same as the stored chroma color, then operation continues at block 306 where the output texel has the same color as the input texel. In one embodiment of the present invention, the output texel has signal component values (A, R, G, B) of 1, R, G, and B, respectively.

Thus, if the color of the input texel is different from the chroma color then the output texel will have the same red, green, and blue signal components as the input texel, with the alpha signal component set equal to 1. This results in an opaque output texel having the same color as the input texel. In the alternate embodiment of the present invention utilizing the YCBCR color model, the output texel has signal component values (A, CR, Y, CB) of 1, CR, Y, CB, respectively.

Improvement of the appearance of texture-mapped polygons requires antialiasing texture mapping. Therefore, following the chroma keying operations of either block 304 or block 306, operation continues at block 308 at which all texels output from the chroma keying are filtered utilizing bilinear filtering. There are many well-known techniques for antialiasing texture mapping. The preferred embodiment of the present invention utilizes bilinear filtering. Bilinear filtering takes the color of the four nearest texels and weighs the colors together to get a filtered representation of that texture. When applying bilinear filtering, the output pixel is a function of four adjacent input pixels. Filtering the texels results in a filtered color signal that is comprised of filtered alpha, red, green, and blue components.

Following filtering, operation continues at block 310, at which the red, green, and blue components of the filtered signal are fogged. Fog is generated according to equations (1)–(4). In equations (1)–(4), R, G, B, and A represent the red, green, blue, and alpha components of the filtered color signal from block 308, respectively. Rfog, Gfog, and Bfog represent the red, green, and blue components of the fog color, respectively, and f represents the fog factor. The fog factor (f), which represents the amount or percentage of coverage of fog, can have a value ranging from 0 to 1, inclusive. If f is 0 then no fog is displayed; if f is 1 then only fog is displayed.

Following fogging, operation continues at block 312, at which the fogged, filtered texels are blended with a background color to produce an output color signal. The output color signal (Ao, Ro, Go, Bo) generated from blending is generated according to equations (11)–(14). In equations (11)–(14), R1, G1, B1, and A1 represent the red, green, blue, and alpha components of the fogged and filtered signal from block 310, respectively. Rb, Gb, Bb, and Ab represent the red, green, blue, and alpha components of the background color, respectively. An output color signal is generated for each color signal component (Ao, Ro, Go, Bo). The flow diagram ends at block 314.

When the fog factor is equal to 0 there is to be no fog displayed. In this case, following filtering, the filtered texels are blended with a background color to produce an output color signal. The output color signal (Ao, Ro, Go, Bo) is generated according to equations (6)–(9). In equations (6)–(9), R, G, B, and A represent the red, green, blue, and alpha components of the filtered signal from block 308, respectively. Rb, Gb, Bb, and Ab represent the red, green, blue, and alpha components of the background color, respectively. An output color signal is generated for each color signal component.

Thus, a method and apparatus for chroma keying filtered textures have been provided. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of chroma keying filtered textures in a computer system, comprising the steps of:
   determining whether a texel having a first color matches a predetermined color indicative of transparency;
   replacing said texel having a first color with a texel having a second color when said texel having a first color matches said predetermined color;
   filtering texels to produce a filtered color signal comprising n color components;
   fogging the color components of the texels to produce a fogged and filtered color signal by $Xn1=(Xn*(1-f)+(Xnfog*f*A)$, where Xn represents one color component of the filtered color signal,
   Xnfog represents one color component of the fog color,
   f represents a fog factor, and
   A represents an alpha component of the filtered signal; and blending said filtered and fogged texels with a background color.

2. The method of claim 1, wherein said step of replacing said texel having a first color is accomplished prior to said filtering texels.

3. The method of claim 1, wherein said step of filtering texels comprises the step of antialiasing texels.

4. The method of claim 1, wherein said step of filtering texels comprises the step of bilinear filtering texels.

5. The method of claim 1, wherein the step of filtering texels results in a filtered color signal, said filtered color signal comprising filtered Alpha, Red, Green, and Blue components.

6. The method of claim 1, wherein the step of filtering texels results in a filtered color signal, said filtered color signal comprising filtered components of the YCBCR color model.

7. The method of claim 1, wherein said second color is different from said first color.

8. The method of claim 7, wherein said texel having a second color is a texel having Alpha, Red, Green, and Blue components each equal to 0.

9. The method of claim 7, wherein said texel having a second color is a texel of the YCBCR color model having Alpha, CR, Y, and CB components equal to 0, 128, 16, and 128, respectively.

10. The method of claim 1, wherein when said texel having a first color does not match said predetermined color the color signal Alpha component is set to 1.

11. The method of claim 5, wherein said alpha component (A) of said filtered color signal is blended with an alpha component (Ab) of said background color to produce an output color signal based substantially on the formula $Ao=A+[(1-A)*Ab]$.

12. The method of claim 5, wherein said red component (R) of said filtered color signal is blended with a red component (Rb) of said background color to produce an output color signal (Ro) based substantially on the formula $Ro=R+[(1-A)*Rb]$, said green component (G) of said filtered color signal is blended with a green component (Gb) of said background color to produce an output color signal (Go) based substantially on the formula $Go=G+[(1-A)*Gb]$, and said blue component (B) of said filtered color signal is blended with a blue component (Bb) of said background color to produce an output color signal (Bo) based substantially on the formula $Bo=B+[(1-A)*Bb]$.

13. The method of claim 1, further comprising the step of fogging texels, wherein said step of fogging texels is performed in accordance with a fog factor (f).

14. The method of claim 13, wherein said step of fogging is performed prior to said step of blending said filtered texels with a background color.

15. The method of claim 5, wherein said red component (R) of said filtered color signal is combined with a red component of a fog signal (Rfog) to produce a fogged and filtered signal (R1) based substantially on the formula $R1=[R*(1-f)]+(Rfog*f*A)$, said green component (G) of said filtered color signal is combined with a green component of a fog signal (Gfog) to produce a fogged and filtered signal (G1) based substantially on the formula $G1=[G*(1-f)]+(Gfog*f*A)$, and said blue component (B) of said filtered color signal is combined with a blue component of a fog color (Bfog) to produce a fogged and filtered signal (B1) based substantially on the formula $B1=[B*(1-f)]+(Bfog*f*A)$.

16. The method of claim 15, wherein said fogged and filtered signal (R1) is blended with said red component of said background color (Rb) to produce an output color signal (Ro) based substantially on the formula $Ro=R1+[(1-A1)*Rb]$, said fogged and filtered signal (G1) is blended with said green component of said background color (Gb) to produce an output color signal (Go) based substantially on the formula $Go=G1+[(1-A1)*Gb]$, and said fogged and filtered signal (B1) is blended with said blue component of said background color (Bb) to produce an output color signal (Bo) based substantially on the formula $Bo=B1+[(1-A1)*Bb]$.

17. A computer system comprising:
   a memory;
   a processor subsystem coupled to said memory, said processor subsystem determining whether a texel having a first color matches a predetermined color indicative of transparency, replacing said texel having a first color with a texel having a second color when said texel having a first color matches said predetermined color, filtering texels to produce a filtered color signal comprising n color components, fogging the color components of the texels to produce a fogged and filtered color signal by $$Xn1=(Xn*(1-f))+(Xnfog*f*A),$$

where Xn represents one color component of the filtered color signal,

Xnfog represents one color component of the fog color, f represents a fog factor, and A represents an alpha component of the filtered signal, and blending said filtered and fogged texels with a background color.

18. The computer system of claim 17, wherein the processor subsystem comprises a processor and a coprocessor.

19. The computer system of claim 17, wherein the processor includes a pixel engine is coupled to said processor subsystem, said pixel engine including circuitry for determining whether a texel having a first color matches a predetermined color, said pixel engine circuitry replacing said texel having a first color when said texel having a first color matches said predetermined color.

20. The computer system of claim 19, wherein said pixel engine includes circuitry for filtering texels and for blending said filtered texels with a background color.

21. The computer system of claim 17, wherein said processor subsystem filters texels by antialiasing.

22. The computer system of claim 17, wherein said processor subsystem filters texels by bilinear filtering.

23. The computer system of claim 17, wherein said second color is different from said first color.

24. The computer system of claim 23, wherein said texel of a second color is a texel having Alpha, Red, Green, and Blue components each equal to 0.

25. The computer system of claim 23, wherein said texel of a second color is a texel having Alpha, CR, Y, and CB components equal to 0, 128, 16, and 128, respectively.

26. The computer system of claim 17, wherein when said texel having a first color does not match said predetermined color the processor subsystem sets the color signal Alpha component to 1.

27. The computer system of claim 17, wherein said alpha component (A) of said filtered color signal is blended with an alpha component (Ab) of said background color to produce an output color signal based substantially on the formula Ao=A+[(1−A)*Ab].

28. The computer system of claim 17, wherein said red component (R) of said filtered color signal is blended with a red component (Rb) of said background color to produce an output color signal (Ro) based substantially on the formula Ro=R+[(1−A)*Rb], said green component (G) of said filtered color signal is blended with a green component (Gb) of said background color to produce an output color signal (Go) based substantially on the formula Go=G+[(1−A)*Gb], and said blue component (B) of said filtered color signal is blended with a blue component (Bb) of said background color to produce an output color signal (Bo) based substantially on the formula Bo=B+[(1−A)*Bb].

29. The computer system of claim 20, wherein said pixel engine includes fogging circuitry.

30. The computer system of claim 29, wherein said color components are fogged prior to said blending said filtered texels with a background color.

31. The computer system of claim 17, wherein said red component (R) of said filtered color signal is combined with a red component of a fog signal (Rfog) to produce a fogged and filtered signal (R1) based substantially on the formula R1=[R*(1−f)]+(Rfog*f*A), said green component (G) of said filtered color signal is combined with a green component of a fog signal (Gfog) to produce a fogged and filtered signal (G1) based substantially on the formula G1=[G*(1−f)]+(Gfog*f*A), and said blue component (B) of said filtered color signal is combined with a blue component of a fog color (Bfog) to produce a fogged and filtered signal (B1) based substantially on the formula B1=[B*(1−f)]+(Bfog*f*A).

32. The computer system of claim 31, wherein said fogged and filtered signal (R1) is blended with said red component of said background color (Rb) to produce an output color signal (Ro) based substantially on the formula Ro=R1+[(1−A1)*Rb], said fogged and filtered signal (G1) is blended with said green component of said background color (Gb) to produce an output color signal (Go) based substantially on the formula Go=G1+[(1−A1)*Gb], and said fogged and filtered signal (B1) is blended with said blue component of said background color (Bb) to produce an output color signal (Bo) based substantially on the formula Bo=B1+[(1−A1)*Bb].

33. The method of claim 1, wherein said color component (Xn) of said filtered color signal is combined with a corresponding color component of a fog signal (Xnfog) to produce a fogged and filtered signal (Xn1) based substantially on the formula Xn1=[Xn*(1−f)]+(Xnfog*f*A).

34. The method of claim 33, wherein said fogged and filtered signal (Xn1) is blended with a corresponding color component of said background color (Xnb) to produce an output color signal (Xno) based substantially on the formula Xno=Xn1+[(1−A1)*Xnb].

35. The computer system of claim 17, wherein said color component (Xn) of said filtered color signal is combined with a corresponding color component of a fog signal (Xnfog) to produce a fogged and filtered signal (Xn1) based substantially on the formula Xn1=[Xn*(1−f)]+(Xnfog*f*A).

36. The computer system of claim 35, wherein said fogged and filtered signal (Xn1) is blended with a corresponding color component of said background color (Xnb) to produce an output color signal (Xno) based substantially on the formula Xno=Xn1+[(1−A1)*Xnb].

37. A circuit for chroma keying filtered textures, comprising:

logic for determining whether a texel having a first color matches a predetermined color;

logic for replacing said texel having a first color when said texel having a first color matches said predetermined color;

logic for filtering texels including replaced texels to produce a filtered color signal comprising n color components;

logic for fogging the color components of the texels to produce a fogged and filtered color signal by $$Xn1=[Xn*(1-f)]+[Xnfog*f*A],$$

where Xn represents one color component of the filtered color signal,

Xnfog represents one color component of the fog color, f represents a fog factor, and A represents an alpha component of the filtered signal;

logic for blending said filtered and fogged texels with a background color.

* * * * *